(12) United States Patent
Baumann et al.

(10) Patent No.: US 12,522,448 B2
(45) Date of Patent: Jan. 13, 2026

(54) SUPPLY DEVICE FOR CANNULAS, METHOD FOR SUPPLYING CANNULAS, COMPUTER PROGRAM, AND COMPUTER-READABLE MEDIUM

(71) Applicant: Zahoransky Automation & Molds GmbH, Freiburg (DE)

(72) Inventors: Frank Baumann, Kappel-Grafenhausen (DE); Stefan Simon, Breitnau (DE)

(73) Assignee: Zahoransky Automation & Molds GmbH, Freiburg (DE)

( * ) Notice: Subject to any disclaimer, the term of this patent is extended or adjusted under 35 U.S.C. 154(b) by 583 days.

(21) Appl. No.: 18/017,887

(22) PCT Filed: Jul. 19, 2021

(86) PCT No.: PCT/EP2021/070103
§ 371 (c)(1),
(2) Date: May 24, 2023

(87) PCT Pub. No.: WO2022/023097
PCT Pub. Date: Feb. 3, 2022

(65) Prior Publication Data
US 2023/0278810 A1    Sep. 7, 2023

(30) Foreign Application Priority Data
Jul. 27, 2020   (DE) .................. 102020119681.4

(51) Int. Cl.
B65G 47/90    (2006.01)
A61M 5/34    (2006.01)
B65G 47/91    (2006.01)

(52) U.S. Cl.
CPC ............. B65G 47/90 (2013.01); A61M 5/343 (2013.01); B65G 47/905 (2013.01); B65G 47/91 (2013.01); B65G 47/915 (2013.01)

(58) Field of Classification Search
CPC ...... B65G 47/90; B65G 47/905; B65G 47/91; B65G 47/915; B65G 65/00; A61M 5/343; B65B 3/003
See application file for complete search history.

(56) References Cited

U.S. PATENT DOCUMENTS

2006/0188358 A1    8/2006  Bonora et al.
2019/0336705 A1*   11/2019 Kopperschmidt .... A61M 5/343

FOREIGN PATENT DOCUMENTS

DE      0030353 B1 *   7/1984   ....... B29C 66/12469
DE      202008018272    8/2012
EP      0030353        12/1980

* cited by examiner

Primary Examiner — Thomas Randazzo
(74) Attorney, Agent, or Firm — Volpe Koenig

(57) ABSTRACT

The invention relates to improvements in the technical field of supplying cannulas (2). For this purpose, there is proposed, inter alia, a supply device (1), the removal carriage (4) of which includes at least one cannula receptacle (6) for accommodating a cannula (2), said cannula receptacle (6) being connectable or connected to a vacuum source (7) in order for a cannula (2) to be fixed in the cannula receptacle (6).

21 Claims, 4 Drawing Sheets

SUPPLY DEVICE FOR CANNULAS, METHOD FOR SUPPLYING CANNULAS, COMPUTER PROGRAM, AND COMPUTER-READABLE MEDIUM

CROSS-REFERENCE TO RELATED APPLICATIONS

This application claims the benefit of International Application No. PCT/EP2021/070103, filed Jul. 19, 2021, which claims priority to German Patent Application No. 10 2020 119 681.4, filed Jul. 27, 2021, both of which are incorporated herein by reference as if fully set forth.

TECHNICAL FIELD

The invention relates to supply devices for supplying cannulas, a method for supplying cannulas, a computer program, and a computer-readable medium.

BACKGROUND

For example, in the automated production of syringes, it may be necessary to separate individual cannulas from a stock and make them available for downstream process steps.

SUMMARY

The object of the invention is to simplify the provision of cannulas.

In order to achieve this object, a supply device for supplying cannulas is first of all proposed, which has one or more of the features disclosed herein directed to such a supply device. Thus, in order to achieve this object, the invention proposes in particular a supply device for supplying cannulas, with a cannula magazine and with a removal carriage for removing cannulas from the cannula magazine and for transporting the cannulas to a supply position. According to the invention, the removal carriage has at least one cannula receptacle for a cannula, which cannula receptacle is connectable or connected to a vacuum source in order for a cannula to be fixed in the cannula receptacle.

To remove cannulas from the cannula magazine, the removal carriage can be guided past a removal opening of the cannula magazine in a removal movement, for example below the cannula magazine. Assisted by gravity and/or a pusher, the cannulas stored in the cannula magazine can enter the at least one cannula receptacle of the removal carriage. With the aid of the vacuum source, a vacuum can be generated which can act on the cannula receptacle, and on a cannula placed therein, via a connection between the at least one cannula receptacle and the vacuum source.

With the aid of the vacuum, which acts on the cannula positioned in the cannula receptacle, the cannula can be fixed reliably, and at the same time gently, in the cannula receptacle and thus on the removal carriage. It is thereby possible to avoid loss of the cannula during a movement of the removal carriage to a transfer position. This can simplify the handling of the supply device, increase the reliability of the supply device, and simplify the supplying of cannulas.

Furthermore, the supply device can be equipped with a position correction device, which is configured to align a cannula, arranged in the at least one cannula receptacle, in a target position.

When a cannula is removed from the cannula magazine in the manner already explained above, it is not possible to foresee the position which the cannula will adopt in the at least one cannula receptacle of the removal carriage.

To be able to transfer the cannulas in a defined position to a downstream processing device for carrying out a downstream processing step, the supply device has the aforementioned position correction device. With the latter, a cannula arranged in the at least one cannula receptacle of the removal carriage can be brought into a target position, starting from its actual position. This simplifies firstly the provision of the cannulas and also the further handling and processing of the cannulas in subsequent processing steps.

The position correction device can in particular be configured to rotate a cannula, arranged in the at least one cannula receptacle of the removal carriage, by a defined angular amount, in particular about its longitudinal axis, and/or to move the cannula axially by a defined distance in order to bring the cannula to a target position. The position correction device can thus be configured to correct different positional deviations of the cannulas from a defined target position in the at least one cannula receptacle of the removal carriage.

The position correction device can have at least one alignment means for changing the position of a cannula arranged in the at least one cannula receptacle. The position correction device can for example comprise, as the alignment means, at least one clamping device and/or at least one drive. A cannula can be gripped and clamped with the aid of the at least one clamping device. With the aid of the drive, the gripped and clamped cannula can be rotated and/or moved axially, in order to move it to its target position and to correct any positional deviation.

The supply device can have at least one sensor, in particular a camera, for checking the presence and/or for checking the position of a cannula arranged in the at least one cannula receptacle of the removal carriage. The at least one sensor can therefore be used to determine whether the at least one cannula receptacle of the removal carriage was actually occupied by a cannula upon the removal of cannulas from the cannula magazine. It is also possible to use the at least one sensor to monitor and determine the position of a cannula in the cannula receptacle. Such a sensor is preferably assigned to each cannula receptacle of the removal carriage. The at least one sensor can be arranged on the removal carriage or on a stand of the supply device.

If a deviation from a target position is ascertained when checking the position of the cannula in the at least one cannula receptacle, it is possible to accordingly activate the aforementioned position correction device of the supply device and correct the positional deviation of the cannula.

The supply device can have a controller for this purpose. The controller can be configured to control the position correction device, according to a sensor signal transmitted by the at least one sensor, in order to align a cannula, arranged in the at least one cannula receptacle, in its target position and to correct any positional deviation that may have been determined.

The cannula magazine can be designed as an exchangeable magazine. The supply device can have a holder on which the cannula magazine can be fastened in an exchangeable manner. When changing the model of the cannulas that are to be made available by the supply device, it is in this way possible to remove the cannula magazine, designed as an exchangeable magazine, from the holder and to exchange it for a cannula magazine filled with other cannulas.

In one embodiment of this supply device, it is provided that the cannula magazine is connected to the holder via a form-fit sliding connection, in particular via a dovetail connection.

In all of the aforementioned embodiments of supply devices, the removal carriage for removing cannulas from the cannula magazine can be moved to a transfer position in which it makes the removed cannulas available for subsequent processing steps.

All of the aforementioned supply devices can be equipped with at least one removal gripper. With the aid of the removal gripper, it is possible to remove cannulas from the removal carriage and transfer them to a downstream process step. The cannulas can preferably be removed from the removal carriage when the removal carriage is in the transfer position.

In this context, it may be advantageous if the removal gripper is designed as a vacuum-type gripper. The removal gripper designed as a vacuum-type gripper can have at least one gripping receptacle which is connected to a vacuum source. It is thus possible for cannulas, picked up with the removal gripper, to be held by vacuum in the respective gripping receptacle.

In order for all the cannulas removed from the cannula magazine by the removal carriage to be able to be gripped simultaneously and transferred to a downstream process step, it is advantageous if the removal gripper has a number of gripping receptacles corresponding to the number of cannula receptacles on the removal carriage. The gripping receptacle/gripping receptacles of the removal gripper can be connected here to a vacuum source, preferably to a common vacuum source. In this way, a vacuum can be applied to each of the gripping receptacles formed on the removal gripper, such that the cannulas can be held particularly reliably and gently with the removal gripper.

According to the invention, it is provided that the supply device has a lifting means for raising and lowering a stock of cannulas located in the cannula magazine. In particular after a magazine exchange, a stock of loose cannulas contained in the cannula magazine can firstly be raised with the aid of the lifting means for subsequent removal. The removal carriage can then be positioned below a removal opening of the bristle magazine. As soon as the removal carriage has adopted its starting position below the removal opening, the stock of loose cannulas stored within the cannula magazine can be carefully lowered onto the upper side of the removal carriage facing the removal opening with the aid of the lifting means. The careful lifting and lowering of the loose cannulas prevents the loose cannulas from tilting within the bristle magazine.

The movement performed by the lifting means during the lifting and lowering can be predefined and/or guided by a guide. A comparatively simple cam control of the lifting means can thus be predefined with the guide. Such cam control is particularly robust and also comparatively easy to implement.

In order to create sufficient space for the lifting means when the removal carriage is in the starting position on the cannula magazine, in particular below the cannula magazine, and to avoid a collision of the lifting means with the removal carriage, the invention provides that the removal carriage has a longitudinal groove into which the lifting device can engage. The longitudinal groove is preferably open at the edge, so that the lifting means, for example along the aforementioned guide, can be moved at the front end into the longitudinal groove and raised by a lifting movement from below in the direction of the cannula magazine. The lifting means can thus also be moved into the aforementioned longitudinal groove when the removal carriage is arranged in the starting position below the cannula magazine. The lifting means can reach in front of the removal opening of the cannula magazine and can be moved, by a corresponding lifting movement, against the stock of cannulas arranged therein. The stock of cannulas can be lifted off the surface of the removal carriage by a further lifting movement. When the stock of cannulas has been lifted, at least one securing means, for example at least one securing pin, can be pushed in front of the removal opening in order to prevent cannulas from falling out of the cannula magazine.

The removal carriage can moreover have a recess into which a removal gripper, for example the aforementioned removal gripper, can engage during the removal of cannulas. The recess for the removal gripper can be aligned transversely or at right angles to the at least one cannula receptacle. Furthermore, the at least one recess can be arranged in such a way that it divides the at least one cannula receptacle into two receptacle portions. Each of the two receptacle portions of a cannula receptacle can be connected to a or the vacuum source. All the receptacle portions of all the cannula receptacles of the removal carriage are preferably connected to a common vacuum source.

In one embodiment of the supply device, it is provided that at least one suction point connected to the vacuum source is present in or on the at least one cannula receptacle. By way of the at least one suction point in or on the cannula receptacle, the vacuum from the vacuum source can be transferred to a cannula positioned in the cannula receptacle in order to fix the cannula.

In one embodiment of the supply device, it is provided that at least one suction point connected to the vacuum source is present in or on each cannula receptacle of the supply device.

Particularly in the case of a cannula receptacle that is divided into two or more receptacle portions, it may be expedient if at least one suction point connected to the vacuum source is present in each receptacle portion of the cannula receptacle. In this way, cannulas that are positioned in the cannula receptacle can be fixed particularly reliably by vacuum in the cannula receptacle of the removal carriage.

The aforementioned lifting means can be insertable into the cannula magazine through a removal opening of the cannula magazine, in order to raise a stock of cannulas in the cannula magazine and also lower them again when the lifting means is lowered.

The cannula magazine can have at least one securing means, for example a securing pin. With the aid of the at least one securing means, a removal opening of the cannula magazine, for example the aforementioned removal opening, can be closed. The supply device can have a device for removing and/or attaching the at least one securing means. This device can act as a plug-in device with which a securing means, in particular a securing pin, can be pulled from its closed position in front of and/or within the removal opening of the cannula magazine and, if necessary, can be put back into its securing position.

In one embodiment of the supply device, which can be used in shuttle mode and is therefore particularly productive, it is provided that the removal carriage has two removal fields, each with at least one cannula receptacle, and can be moved in shuttle mode between two transfer positions arranged on different sides of the cannula magazine. If the removal carriage is moved past the cannula magazine in one direction, one removal field is filled with at least one cannula. The already filled removal field is then moved to the transfer position on one side of the cannula magazine. There, the at least one cannula of the filled removal field is kept ready and, for example, gripped by a removal gripper and fed to a downstream process step. On the return path of the removal carriage, i.e. during the return stroke of the removal carriage, the other removal field, which is being filled with at least one cannula or has already been filled on the return movement, can be moved to the other transfer position, and at least one cannula arranged in the other removal field can be moved to the transfer position for removal, in particular with the aid of a removal gripper. In this way, idle strokes of the removal carriage are avoided, which can correspondingly increase the productivity of the supply device.

The object is also achieved by a method for supplying cannulas for a downstream process step in the processing of cannulas, in particular in the production of syringes, which method has the means and features as disclosed herein directed to such a method. Thus, to achieve the object, a method for supplying cannulas is proposed in which a supply device as disclosed herein is used, wherein at least one cannula is removed by the removal carriage from the cannula magazine of the supply device, after which the position of at least one cannula in the at least one cannula receptacle of the removal carriage is detected with the aid of at least one sensor, and wherein, in the event of a deviation in position of the cannula from a target position, the cannula is aligned in the target position with the aid of the position correction device of the supply device.

The at least one properly aligned cannula can then be removed from the cannula receptacle of the removal carriage with the aid of a removal gripper and transferred to a downstream process step.

Finally, the object is also achieved by a computer program that includes commands that cause the supply device to carry out the method as disclosed herein.

The computer program can be stored on a computer-readable medium. The computer-readable medium can be a conventional data carrier, for example a programmable memory, a USB memory, a CD-ROM or another memory module. Of course, a cloud-based memory is also possible as a computer-readable medium.

BRIEF DESCRIPTION OF THE DRAWINGS

The invention will now be described in more detail on the basis of an exemplary embodiment, but it is not limited to this exemplary embodiment. Further exemplary embodiments of the invention are obtained by combining individual or multiple of the features disclosed herein with one another and/or by combining individual or multiple features of the exemplary embodiment shown in the following figures, where.

DETAILED DESCRIPTION

Figure 1:
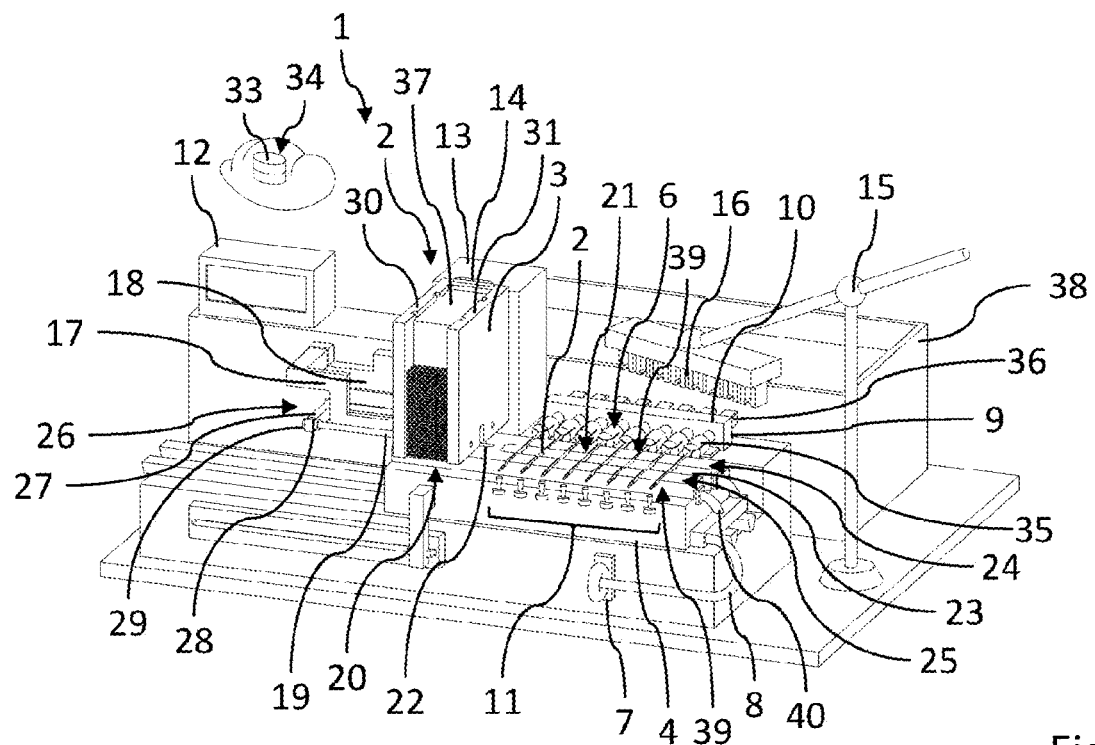
FIG. 1 shows a perspective view of a supply device for supplying cannulas, with a cannula magazine and with a removal carriage assigned to the cannula magazine, on the upper side of which removal carriage there are a total of eight cannula receptacles, into which cannulas from the cannula magazine reach when, during a removal movement, the removal carriage is moved past a removal opening at the underside of the cannula magazine.
Figure 2:
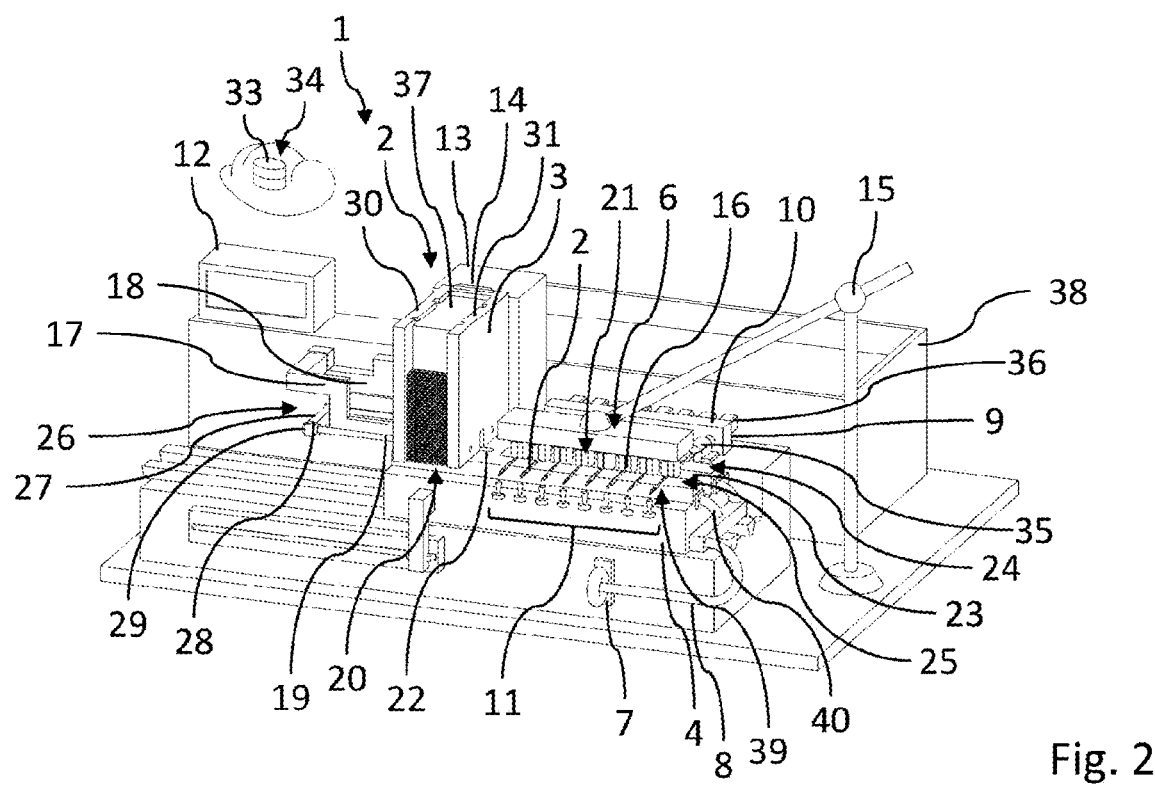
FIG. 2 shows a perspective view of the supply device shown in FIG. 1, with a removal gripper of the device being arranged here in the removal position on the removal carriage.

FIGS. 1 to 5 show a supply device, denoted as a whole by reference sign 1, for supplying cannulas 2 for downstream process steps, such as are applied, for example, in the production of syringes, for which the cannulas 2 are required.

The supply device 1 has a cannula magazine 3 and a removal carriage 4. The removal carriage 4 is moved past the cannula magazine 3 in a removal movement in order to remove cannulas 2 from the cannula magazine 3. Here, the removal carriage 4 passes a removal opening 5 of the cannula magazine 3, through which removal opening 5 cannulas 2 are fed to the removal carriage 4 from the cannula magazine 3. Supported by gravity and by a pusher 37, the cannulas 2 stored in the cannula magazine 3 can enter the cannula receptacles 6 of the removal carriage 4. Furthermore, the removal carriage 4 is used to transport the cannulas to a transfer position and to make them available there for downstream processing steps.

The removal carriage 4 of the supply device 1 shown in the figures has, on its upper side, a total of eight cannula receptacles 6 for one cannula 2 each. The cannula receptacles 6 are connected to a vacuum source 7 of the supply device 1 in order to fix the cannulas 2 in the cannula receptacles 6. A vacuum generated by the vacuum source 7 is transmitted to the cannula receptacles 6 via a vacuum connection 8 and can act there on the cannulas 2 positioned in the cannula receptacles 6, in order to fix the cannulas 2 in the cannula receptacles 6.

The supply device 1 has a position correction device 9. The position correction device 9 is configured to bring the cannulas 2, arranged in the cannula receptacles 6, to a target position if the cannulas 2 are not correctly positioned in the cannula receptacles 6. For this purpose, the position correction device 9 has a number of alignment means 10 corresponding to the number of cannula receptacles 6 on the removal carriage 4, with which alignment means 10 the cannulas 2 positioned in the cannula receptacles 6 can be clamped and aligned.

The position correction device 9, with its alignment means 10, is configured to rotate the cannulas 2, arranged in the cannula receptacles 6, by a defined angular amount about their longitudinal axis and to axially move the cannulas 2 by a defined distance, in order to align the cannulas 2 if necessary and to bring them to their target position. The position correction device 9 comprises a total of eight clamping devices 35 and eight drives 36 connected to the clamping devices 35. Cannulas 2 arranged in the cannula receptacles 6 can be clamped with the clamping devices 35 and, if a positional deviation is detected, can be rotated and/or axially moved with the aid of the drives 36 in order to correct the positional deviation.

The supply device 1 has a plurality of sensors 11, which are designed as cameras in the exemplary embodiment of the supply device 1 shown in the figures. The sensors 11 are used to determine whether the cannula receptacles 6 are occupied by cannulas 2 and also whether the cannulas 2 arranged in the cannula receptacles 6 are properly aligned.

If a positional deviation of one or more or all of the cannulas 2 in the cannula receptacles 6 from a target position can be determined, the position of the cannulas 2 in the cannula receptacles 6 of the removal carriage 4 can be corrected with the aid of the position correction device 9. In this case, the position can include both a position of the cannula 2 in the cannula receptacle 6 and a rotational setting of the cannula 2 in the cannula receptacle 6.

The supply device 1 is equipped for this purpose with a controller 12. The controller 12 is configured to activate the position correction device 9 according to a sensor signal transmitted by the at least one sensor 11, in order to align one or more of the cannulas 2 arranged in the cannula receptacles 6, if a position deviation is detected with the aid of the sensors 11.

The cannula magazine 3 of the supply device as shown in the figures is designed as an exchangeable magazine. The supply device 1 has a holder 13 on which the cannula magazine 3, designed as an exchangeable magazine, is fastened in an exchangeable manner. By virtue of the holder 13 and the design of the cannula magazine 3 as an exchangeable magazine, the cannula magazine 3 can, if necessary, be very easily and, above all, quickly exchanged for a cannula magazine 3 filled with other cannulas 2.

The cannula magazine 3 is connected to the holder 13 via a releasable form-fit connection 14, which is designed here as a sliding connection, namely as a dovetail connection.

The supply device 1 has a removal gripper 15. The removal gripper 15 is designed as a vacuum-type gripper and is in turn likewise connected to a vacuum source 7.

The removal gripper 15 has a total of eight gripping receptacles 16, hence a number of gripping receptacles 16 that corresponds to the number of cannula receptacles 6 on the removal carriage 4.

The supply device 1 also has a lifting means 17 in the form of a lifting strip. The lifting means 17 serves, as and when required, to raise and lower a stock of cannulas located in the cannula magazine 3. A movement of the lifting means 17 is predefined and guided by a guide 18.

Figure 4:
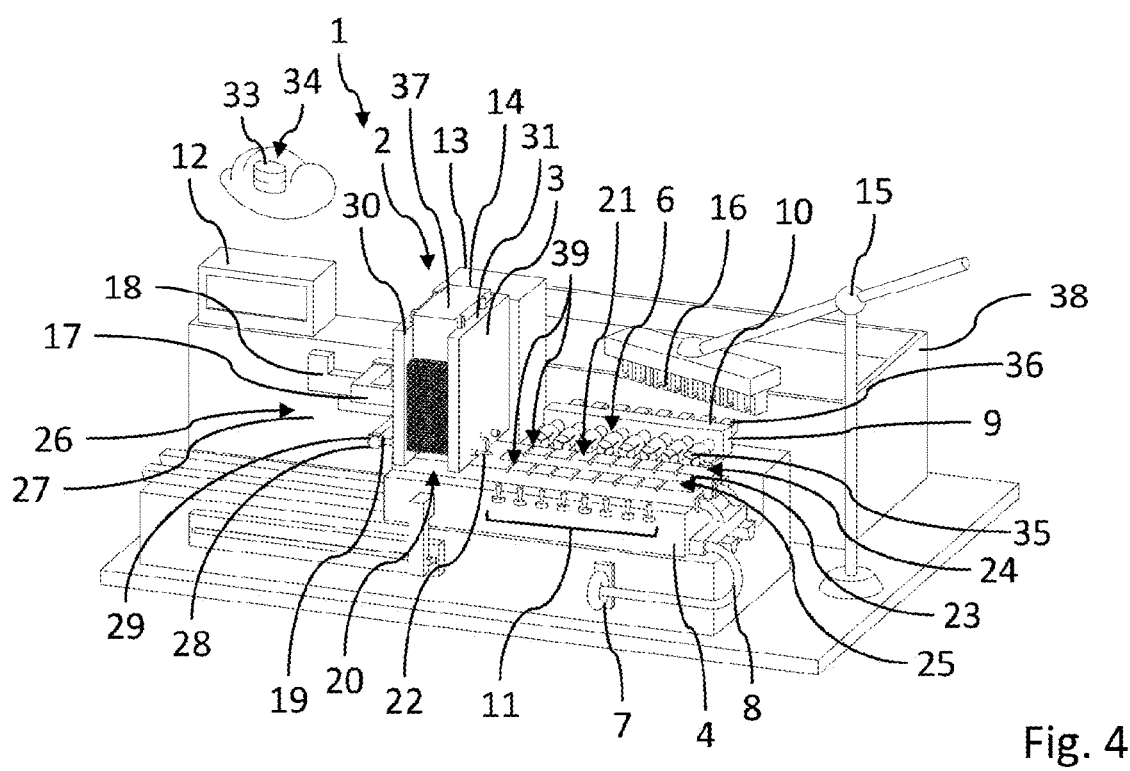
FIG. 4 shows a further perspective view of the supply device shown in FIGS. 1 to 3, here with two safety pins pushed in front of the removal opening of the cannula magazine in order to prepare for a magazine exchange.

The function of the lifting means 17 will become clear from FIG. 4. FIG. 4 shows the supply device 1 after a new cannula magazine 3 has been attached to the holder 13. The figure shows two securing means 19 in the form of securing pins, by means of which the removal opening 5 of the cannula magazine 3 is closed on the underside. The cannulas 2 stocked in the cannula magazine 3 are held back by the securing means 19. Before the securing means 19 can be pulled in order to allow the cannulas 2 to pass through the removal opening 5 of the cannula magazine 3, the lifting means 17 is brought to the position shown in FIG. 4. For this purpose, the lifting means 17 is pushed from below into the removal opening 15 of the cannula magazine 3, as a result of which the cannulas 2 arranged in the cannula magazine 3 are raised. The securing means 19 can then be pulled in order to open the removal opening 5 of the cannula magazine 3 for the cannulas 2.

Figure 5:
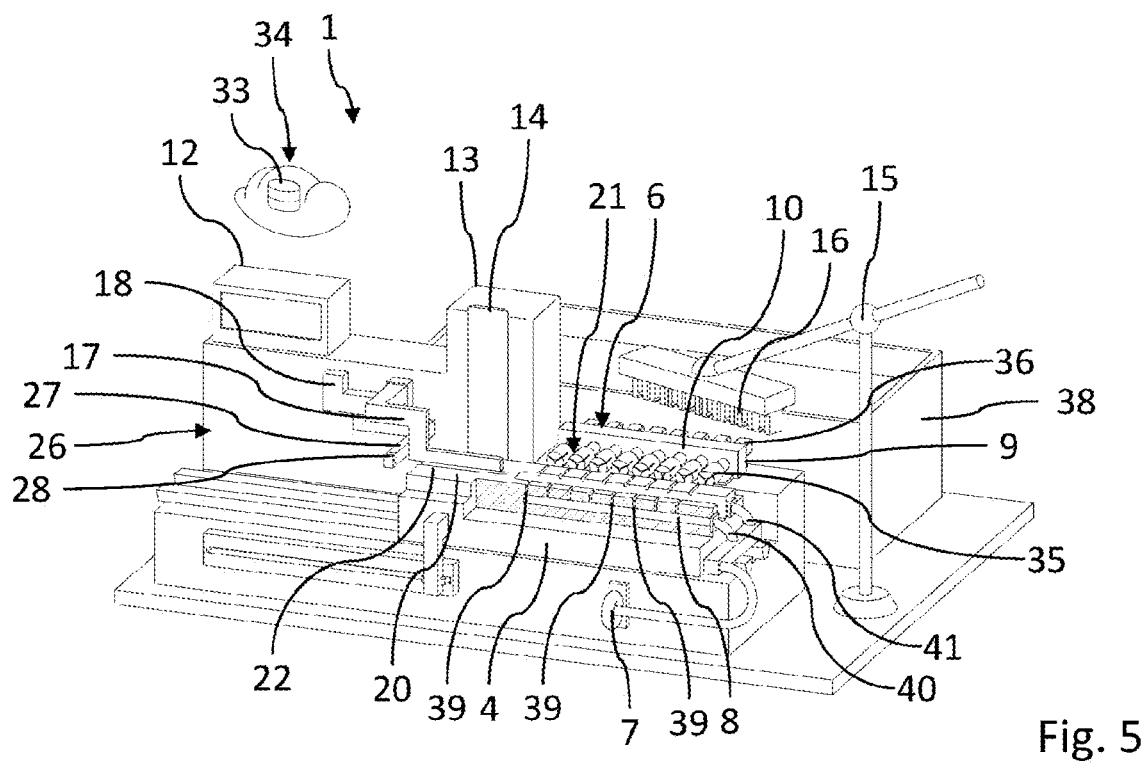
FIG. 5 shows a partially broken perspective illustration of the supply device shown in FIGS. 1 to 4, in order to illustrate the connection of the cannula receptacles of the removal carriage to a vacuum source.

Before the actual removal of the cannulas 2 from the cannula magazine 3 can be done with the aid of the removal carriage, the lifting means 17 carefully places the cannulas 2 on the upper side of the removal carriage 4. In the process, the cannulas 2 come into contact with a region 20 of the removal carriage 4 which is arranged adjacent to a removal field 21 with the cannula receptacles 6 on the upper side of the removal carriage. To allow the lifting means 17 to deposit the cannulas 2 onto the region 20 of the removal carriage 4, the removal carriage 4 has a longitudinal groove 22, which is open at the edge and into which the lifting means 17 can engage when the removal carriage 4 is arranged below the cannula magazine 3. FIG. 5 shows the lifting means 17 above the longitudinal groove 22 in the removal carriage 4.

The removal carriage 4 moreover has a recess 23 into which the aforementioned removal gripper 15 can be moved during the removal of cannulas 2 from the cannula receptacles 6. The recess 23 runs at right angles to the total of eight cannula receptacles 6. Each of the cannula receptacles 6 is divided by the recess 23 into two receptacle portions 24 and 25. The receptacle portions 24 and 25 are connected to the vacuum source 7 via the vacuum connection 8, which can be seen clearly in FIG. 5 for example. As has already been mentioned above, the lifting means 17 can be inserted into the cannula magazine 3 through the removal opening 5 of the cannula magazine 3, in order to raise the stock of cannulas in the cannula magazine 3 in the above-described manner and also, when so required, to lower them again.

FIGS. 1 to 5 make clear that each cannula receptacle 6 of the removal carriage 4 has two suction points 39 connected to the vacuum source 7. The vacuum provided by the vacuum source 7 for fixing the cannulas 2 can be transferred to the cannula receptacles 6, and to the cannulas 2 positioned therein, via the suction points 39. As has already been explained above, each of the cannula receptacles 6 of the removal carriage 4 shown in the figures is divided into two receptacle portions 24 and 25. Each of the receptacle portions 24 and 25 of each cannula receptacle 6 has at least one suction point 39 connected to the vacuum source 7. In this way, the cannulas 2 can be fixed particularly reliably in the receptacle portions 24 and 25 of the individual cannula receptacles 6 of the removal carriage 4 by means of negative pressure. The two rows of receptacle portions 24 and 25 of the cannula receptacles 6 of the removal carriage 4 are each connected to the vacuum source 7 via respective vacuum lines 40, 41, each of which is part of the aforementioned vacuum connection 8.

Figure 6:
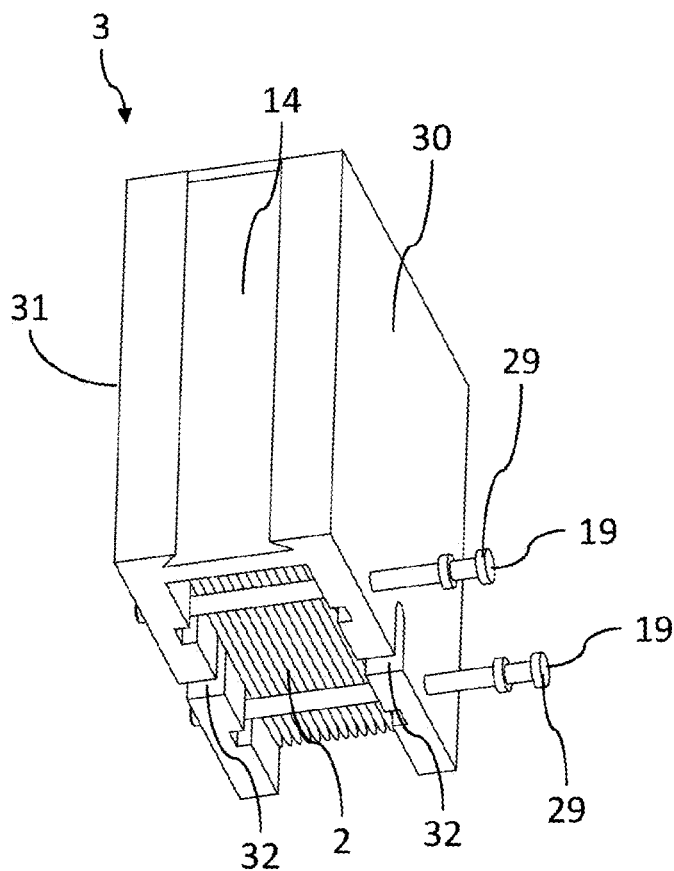
FIGS. 6 and 7 show perspective views of a cannula magazine in order to illustrate the function of the securing pins and of a sliding connection for the exchangeable attachment of the cannula magazine to a holder of the supply device.
Figure 7:
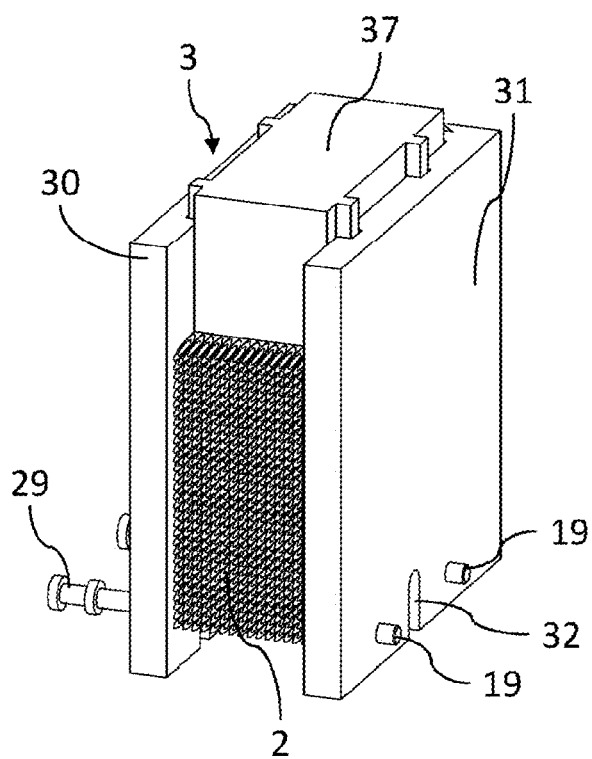

For the removal and attachment of the two securing means 19, the supply device 1 has a device 26 for removing and attaching the securing means 19. The device 26 comprises a strip 27 with two spaced-apart grooves 28 into which heads 29 of the securing means 19 can engage. The heads 29 of the securing means 19 can be seen clearly in FIGS. 6 and 7, for example. In the grooves 28, one of which can be seen for example in FIG. 5, the heads 29 of the securing means 19 can be fixed with form-fit engagement on the cannula magazine 3 in respect of a plug-in direction and pull-out direction of the securing means, such that they can be plugged in and also pulled out with the aid of the strip 27 of the device 26. FIG. 6 in particular makes clear that the cannula magazine 3 has a slit 32 on each of two opposite walls 30, 31, through which slit 32 the lifting means 17 for raising and lowering the cannulas 2 in the cannula magazine 3 can be inserted into the cannula magazine 3.

In an embodiment of the supply device 1 not shown in the figures, the removal carriage 3 has two removal fields, each with at least one cannula receptacle 6 for a cannula 2. The removal carriage 3 of this embodiment of the supply device 1 can be moved in shuttle mode between two transfer positions arranged on different sides of the cannula magazine 3. In this way, an idle stroke of the removal carriage 4 is avoided, which can increase the productivity of the supply device 1.

Figure 3:
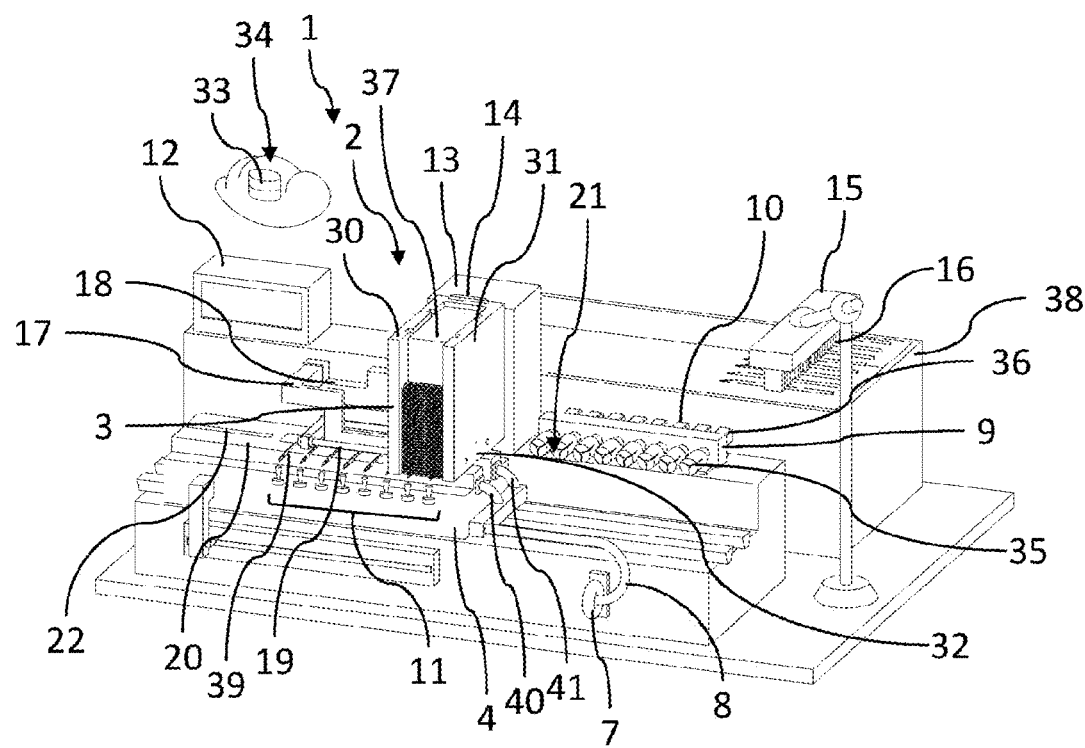
FIG. 3 shows the supply device, shown in FIGS. 1 and 2, with a removal carriage located at the end of its removal movement.

The following method for supplying cannulas 2 for a downstream process step in the processing of cannulas 2, in particular in the production of syringes, can be carried out using the supply device 1 shown in the figures. It is provided that the cannulas 2 are removed from the cannula magazine 3 of the supply device 1 with the removal carriage 4. The position of at least one cannula 2 in at least one of the cannula receptacles 6 of the removal carriage 4 is then detected with the aid of a sensor 11. A cannula 2 that has a positional deviation can then be brought to a target position with the aid of the position correction device 9 of the supply device 1, depending on a positional deviation of the cannula 2 detected with the aid of the sensor 11 and the controller 12 of the supply device. The cannulas 2 can then be removed from the cannula receptacles 6 of the removal carriage 4 in their intended position with the aid of the removal gripper 15 and transferred to a downstream process step. The transfer of the cannulas 2 to a downstream processing device 38 for carrying out a downstream process step is shown in FIG. 3, for example. In one of the downstream process steps, it is possible to feed the cannulas 2 to an injection mold and to encapsulate them with plastic, for example in order to produce syringes.

On a computer-readable medium 33, here in a cloud-based data memory, a computer program 34 is stored which includes commands that cause the supply device to perform the method described above.

The invention relates to improvements in the technical field of supplying cannulas 2. For this purpose, there is proposed, inter alia, a supply device 1, the removal carriage 4 of which includes at least one cannula receptacle 6 for accommodating a cannula 2, said cannula receptacle 6 being connectable or connected to a vacuum source 7 in order for a cannula 2 to be fixed in the cannula receptacle 6.

LIST OF REFERENCE SIGNS 1 supply device
2 cannula
3 cannula magazine
4 removal carriage
5 removal opening
6 cannula receptacle
7 vacuum source
8 vacuum connection
9 position correction device
10 alignment means
11 sensor
12 controller
13 holder
14 releasable form-fit connection
15 removal gripper
16 gripping receptacles
17 lifting means
18 guide
19 securing means
20 region
21 removal field
22 longitudinal groove
23 recess
24 receptacle portion
25 receptacle portion
26 device for removing and/or attaching the securing means
27 strip
28 groove
29 heads of 19
30 wall of 3
31 wall of 3
32 slit
33 computer-readable medium, cloud-based data memory
34 computer program
35 clamping device
36 drive
37 pusher
38 downstream processing device
39 suction point in 6, 24, 25
40 vacuum line
41 vacuum line

The invention claimed is:

1. A supply device (1) for supplying cannulas (2), comprising:
a cannula magazine (3);
a removal carriage (4) configured for removing cannulas (2) from the cannula magazine (3) and for transporting the cannulas (2) to a supply position, the removal carriage (4) including at least one cannula receptacle (6) for a cannula (2);
said cannula receptacle (6) being connectable or connected to a vacuum source (7) that is apply able to fix one said cannula (2) in the cannula receptacle (6);
a lifting means (17) for raising and lowering a stock of cannulas located in the cannula magazine (3); and
the removal carriage (4) has a longitudinal groove (22) into which the lifting means (17) is engageable.

2. The supply device (1) as claimed in claim 1, wherein the removal carriage (4) for removing cannulas (2) from the cannula magazine (3) is movable past the cannula magazine (3) in a removal movement, and the cannula magazine (3) comprises an exchangeable magazine.

3. The supply device (1) as claimed in claim 1, further comprising a holder (13), and the cannula magazine (3) is connected to the holder (13) via a releasable form-fit connection (14).

4. The supply device as claimed in claim 1, further comprising at least one suction point connected to the vacuum source in or on the at least one cannula receptacle.

5. The supply device (1) as claimed in claim 1, wherein the removal carriage (3) has two removal fields, each with at least one said cannula receptacle (6) for one of the cannulas (2), and is movable in shuttle mode between two transfer positions arranged on different sides of the cannula magazine (3).

6. The supply device (1) as claimed in claim 1, further comprising a removal gripper (15).

7. The supply device as claimed in claim 6, wherein the removal gripper has a number of gripping receptacles corresponding to a number of cannula receptacles on the removal carriage.

8. The supply device (1) as claimed in claim 1, wherein the longitudinal groove of the removal carriage (4) is a open at an edge, and a lifting means (17) for raising and lowering a stock of the cannulas located in the cannula magazine (3) is engageable in the longitudinal groove (22) when the removal carriage (4) is arranged below the cannula magazine (3).

9. The supply device (1) as claimed in claim 8, wherein the removal carriage (4) has a recess (23) into which a removal gripper (15) is movable during the removal of cannulas (2), and the recess (23) is aligned transversely or at right angles to the at least one cannula receptacle (6).

10. The supply device (1) as claimed in claim 1, wherein the cannula magazine (3) has at least one securing means (19), with which a removal opening (5) of the cannula magazine (3) is closeable.

11. The supply device (1) as claimed in claim 10, further comprising a device (26) for at least one of removing or attaching the at least one securing means (19).

12. The supply device (1) as claimed in claim 1, further comprising a position correction device (9) configured to align a cannula (2), arranged in the at least one cannula receptacle (6), in a target position.

13. The supply device (1) as claimed in claim 12, wherein the position correction device (9) is configured to at least one of rotate a cannula (2), arranged in the at least one cannula receptacle (6) by a defined angular amount or to move the cannula (2) axially by a defined distance in order to align the cannula (2) in a target position.

14. The supply device as claimed in claim 13, further comprising at least one sensor configured to check at least one of presence or position of the cannula arranged in the at least one cannula receptacle of the removal carriage.

15. The supply device (1) as claimed in claim 14, further comprising a position correction device (9) configured to align a cannula (2), arranged in the at least one cannula receptacle (6), in a target position, and a controller (12) configured to activate the position correction device (9) according to a sensor signal transmitted by the at least one sensor (11), in order to align the cannula (2), arranged in the at least one cannula receptacle (6), in the target position.

16. The supply device (1) as claimed in claim 1, further comprising a lifting strip as a lifting means (17) for raising and lowering a stock of the cannulas located in the cannula magazine (3).

17. The supply device as claimed in claim 16, wherein a movement of the lifting means (17) is guided by a guide (18).

18. The supply device (1) as claimed in claim 16, wherein the lifting means (17) is insertable into the cannula magazine (3) through a removal opening (5) of the cannula magazine (3) in order to raise the stock of cannulas in the cannula magazine (3).

19. A method for supplying cannulas for a downstream process step in processing of cannulas, the method comprising:
providing a supply device for the cannulas, the supply device including a cannula magazine, a removal carriage configured for removing the cannulas from the cannula magazine and for transporting the cannulas to a supply position, the removal carriage including at least one cannula receptacle for one said cannula, said cannula receptacle being connectable or connected to a vacuum source that is apply able to fix one said cannula in the cannula receptacle, a lifting means for raising and lowering a stock of cannulas located in the cannula magazine, wherein the removal carriage has a longitudinal groove into which the lifting means is engageable, and a position correction device configured to align one said cannula, arranged in the at least one cannula receptacle, in a target position;
using the supply device and removing the cannulas by the removal carriage from the cannula magazine of the supply device;
detecting a position of at least of one said cannula in the at least one cannula receptacle of the removal carriage using at least one sensor;
bringing the cannula to a target position; and
using a sensor connected to a controller of the supply device to detect a positional deviation of the cannula from the target position and
using a position correction device of the supply device to correct the positional deviation of the cannula from the target position to bring the cannula into the target position.

20. The method as claimed in claim 19, further comprising removing the at least one cannula (2) from the cannula receptacle (6) of the removal carriage (4) using a removal gripper (15) and transferring the at least one cannula (2) to a downstream process step.

21. A computer program fixed in a tangible medium, comprising commands that cause a supply device for cannulas to carry out a method for supplying cannulas, wherein the supply device includes a cannula magazine, a removal carriage configured for removing the cannulas from the cannula magazine and for transporting the cannulas to a supply position, the removal carriage including at least one cannula receptacle for one said cannula, said cannula receptacle being connectable or connected to a vacuum source that is apply able to fix one said cannula in the cannula receptacle, a lifting means for raising and lowering a stock of cannulas located in the cannula magazine, wherein the removal carriage has a longitudinal groove into which the lifting means is engageable, and a position correction device configured to align one said cannula, arranged in the at least one cannula receptacle, in a target position;
and the method comprises:
using the supply device and removing the cannulas by the removal carriage from the cannula magazine of the supply device;
detecting a position of at least of one said cannula in the at least one cannula receptacle of the removal carriage using at least one sensor;
bringing the cannula to a target position; and
using a sensor connected to a controller of the supply device to detect a positional deviation of the cannula from the target position and
using a position correction device of the supply device to correct the positional deviation of the cannula from the target position to bring the cannula into the target position.

* * * * *